United States Patent [19]

Wu

[11] Patent Number: 4,466,204
[45] Date of Patent: Aug. 21, 1984

[54] ELECTRONIC PACE AND DISTANCE COUNTING SHOE

[76] Inventor: Chyuan-Jong Wu, No. 15, Lane 41, Ta-Tung Rd., Fei-Sha Tsun, Su-Hu Hsiang, Yun-Lin Hsien, Taiwan

[21] Appl. No.: 424,102

[22] Filed: Sep. 27, 1982

Related U.S. Application Data

[63] Continuation-in-part of Ser. No. 267,630, May 27, 1981, Pat. No. 4,402,147.

[51] Int. Cl.³ .................. A43B 5/00; A43B 23/00; G01C 22/00
[52] U.S. Cl. ..................................... 36/132; 36/136; 235/105
[58] Field of Search .................. 36/136, 132; 235/105, 235/1 C, 91 R

[56] References Cited

U.S. PATENT DOCUMENTS 4,019,030 4/1977 Tamiz .................................. 36/136

OTHER PUBLICATIONS

PCT Publication Number WO82/03753, published Nov. 11, 1982, filed Apr. 23, 1982.

*Primary Examiner*—Werner H. Schroeder
*Assistant Examiner*—Steven N. Meyers
*Attorney, Agent, or Firm*—Cushman, Darby & Cushman

[57] ABSTRACT

The present invention relates to a device for determining the number of steps and the distance walked.

The present invention not only accumulates the number of steps walked, but also determines the distance which the walker has walked.

7 Claims, 10 Drawing Figures

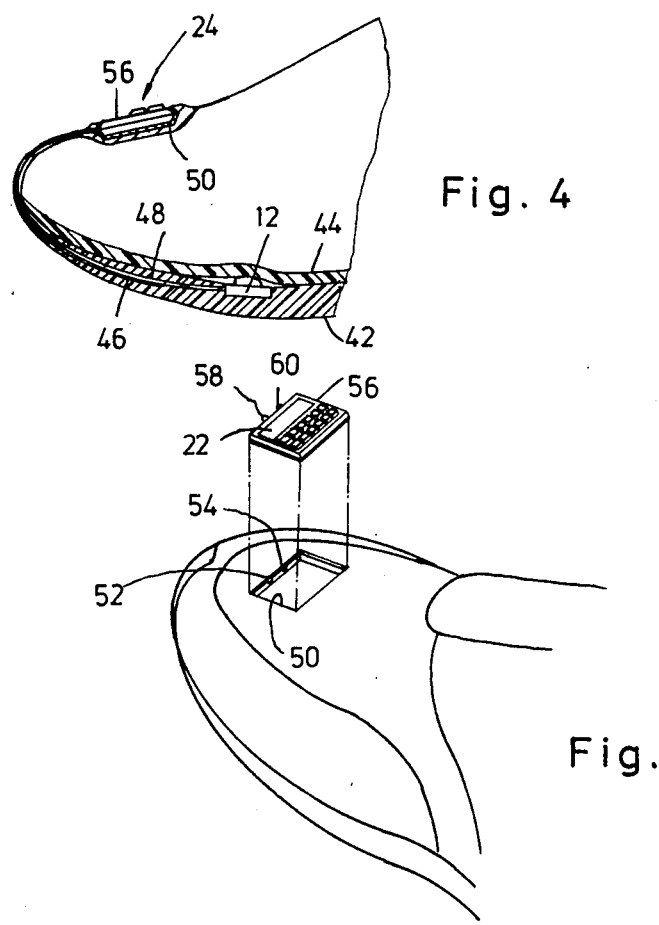
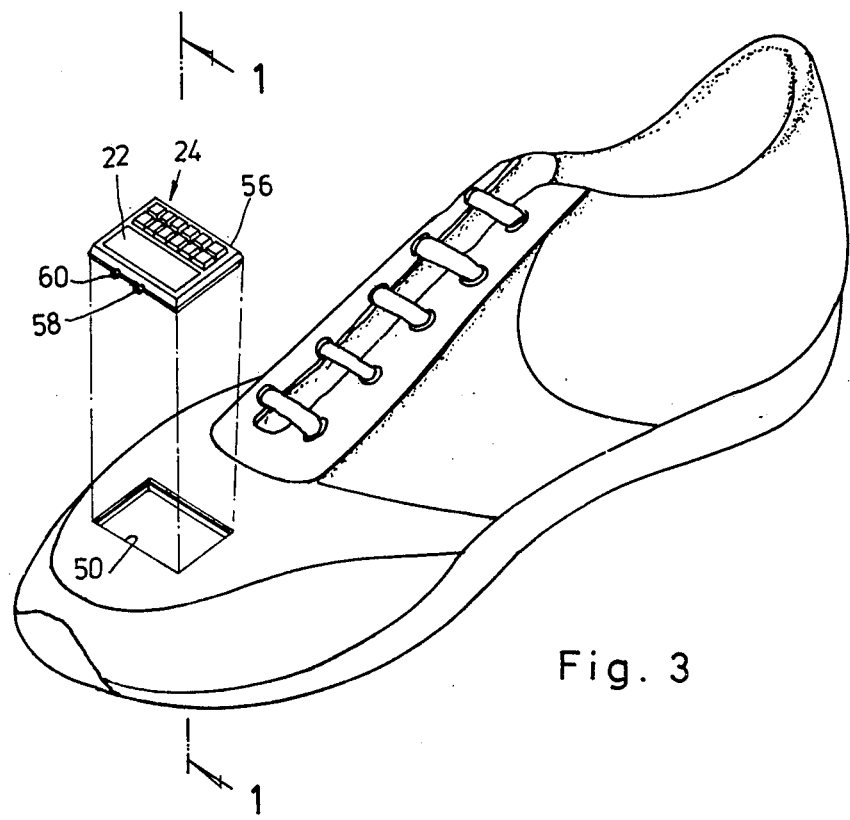

ELECTRONIC PACE AND DISTANCE COUNTING SHOE

The present application is a continuation-in-part of said application Ser. No. 267,630 now U.S. Pat. No. 4,402,147. The disclosure of such applications are incorporated herein by reference.

CROSS REFERENCE TO RELATED APPLICANTS

Reference is made to U.S. applications by the present inventor Ser. No. 176,764, filed Aug. 11, 1980 entitled SHOE WITH AUTOMATIC COUNTER, Ser. No. 267,630 filed May 27, 1981, entitled SHOE HAVING CIRCUITRY AND DISPLAY FOR AUTOMATICALLY DETERMINING NUMBER OF STEPS, and Ser. No. 379,364 filed May 18, 1982, entitled ELECTRONIC MUSIC PACE-COUNTING SHOE.

BACKGROUND OF THE INVENTION

The present invention relates to a device for determining the number of steps and the distance walked.

The present invention not only accumulates the number of steps walked, but also determines the distance which the walker has walked.

SUMMARY OF THE INVENTION

The present invention provides an additional electronic circuit device in a shoe, which comprising a switch adapted for disposition on a shoe, for generating a pace signal in response to each step with said shoe, and an electronic device, responsive to the pace signal. The electronic device is fixed at the shoe vamp and also can be removed from said vamp, and includes; a filter which passes a signal from switch to provide a pulse-wave signal; a counter, means for counting the number of pulse-wave signals; a keyboard, means for putting in the distance of each step made by the walker; a keyboard control interface; a Random Access Memory (RAM); a multiplier, and means for multiplying the data coming from RAM and counter. A data select circuit obtains the data from the counter or multiplier, and a 7-segment display of selected data regarding the number of steps walked or the distance walked is provided.

BRIEF DESCRIPTION OF THE DRAWINGS

Embodiments of the invention are described in the following description taken in connection with the accompanying drawing wherein:

FIG. 2 is a perspective rear view of a shoe showing the contacts and the housing in accordance with the present invention.

FIG. 3 is a perspective rear view of said shoe.

FIG. 4 is a cross sectional view taken along lines 1—1 of FIG. 3, showing the switch and the housing.

DETAILED DESCRIPTION OF THE PREFERRED EXEMPLARY EMBODIMENT

Figure 1:
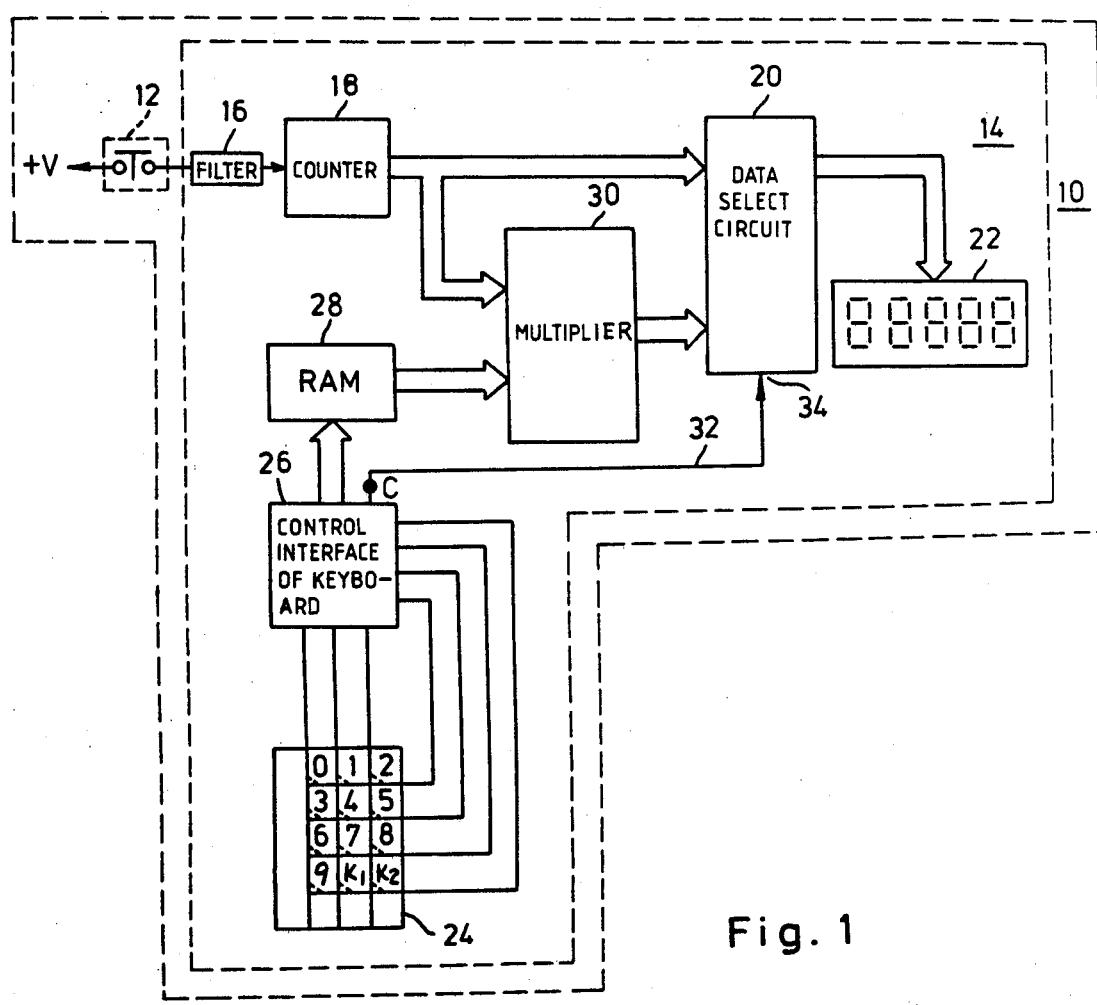
FIG. 1 is a block schematic diagram of electronic circuit in accordance with the present invention.

As shown in FIG. 1, electronic pace and distance counting device 10 in accordance with the present invention comprises a switch 12 and an electronic device 14. Switch 12 is disposed for generating a pace signal in response to each step, as will hereinafter be discussed. Electronic device 14 includes a filter 16, a nominal counter 18 (which may be a location RAM 28, designated by "programming"), a data select circuit 20, a 7-segment display 22, a keyboard 24, a control interface of keyboard 26, a Random Access Memory (RAM) 28, and a multiplier 30. Filter 15 passes signals from switch 12 to provide pulse-wave signals which are respectively transmitted to data select circuit 20 and multiplier 30.

Keyboard 24 includes, digit keys 0–9 and special function keys $K_1$ and $K_2$. If $K_1$ is pressed, the data about the distance of each step made by the walker will be stored into RAM 28 by means of digit keys 0–9 and through control interface of keyboard 26. Multiplier 30 will then multiply the data obtained from counter 18 and RAM 28.

Further, a control contact line 32 is connected with terminal C of the control interface of keyboard 26 and the control terminal 34 of the data select circuit. Before $K_2$ is pressed, control terminal 34 is low, and data select circuit 20 directly selects pace signal from control 18 and transmits it to the 7-segment display 22 to display the number of steps traveled. When $K_2$ is pressed, the control terminal 34 is high, and selects data select circuit 22 signals from multiplier 30 and supplies 7-segment display 22 signal to display the approximate distance traveled.

As shown in FIG. 4, switch 12 is formed in the sole 42, of the associated shoe, and is covered by foot pad 44. Two insulated wires 46 and 48 from switch 12 are connected at their ends to the contacts 52 and 54 formed a case 50 integrally formed in the upper vamp of the shoe (as shown in FIG. 2).

As shown in FIG. 3, the electronic device 14 is arranged in a housing 56 and extrudes contacts 58 and 60. When housing 56 is inserted in case 50, contacts 58 and 60 effect an electrical connection with contacts 52 and 54 respectively, in cleaning the shoe, replacing a battery cell, or device 14 is damaged housing 56 can be removed.

Figure 6:
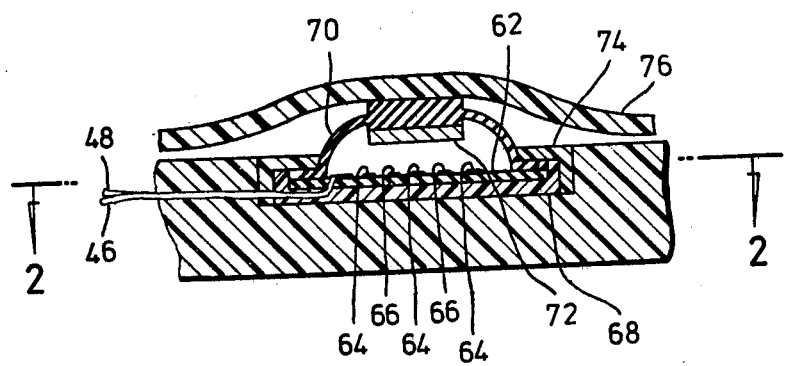
FIG. 6 is a broken sectional view showing the separate condition of contact and the contacts.

As shown in FIG. 6, switch 12 includes an insulating board 62, on which are disposed two contacts 64 and 66. Contacts 64 and 66 communicate through insulated wires 46 and 48 to the housing 56. Insulating board 62 is fixed on a case 68. Thereon, a layer of elastic insulating rubber 70 is disposed. (The insulating rubber 70 is often used in commercial keyboards). A contact 72 is fixed to the underside of insulating rubber 70. The circumferencial periphery insulating rubber 70 and case 68 are covered by a cover 74. And, a foot pad 76 covers over insulating rubber 70 and rises up a little.

Figure 9:
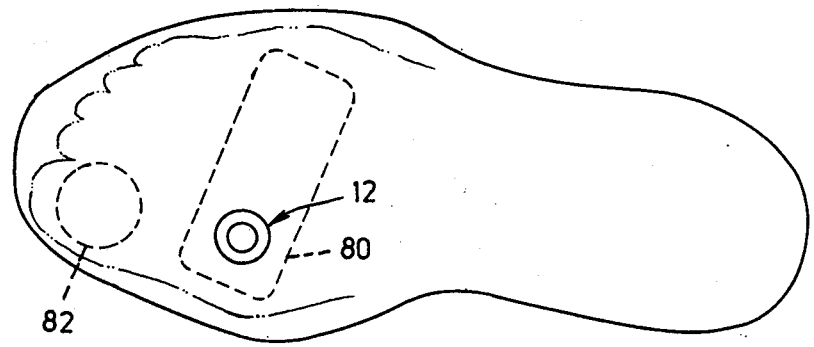
FIG. 9 is a plan view showing the position where the switch is placed.

As shown in FIG. 9, switch 12 is placed in proximity to the toe of the shoe, e.g., under the joints of the big toe, in the area 80 under the joints of another toe, or in the area 82 under the big toe. The position under the joint of the big toe, however, is preferred.

Figure 5:
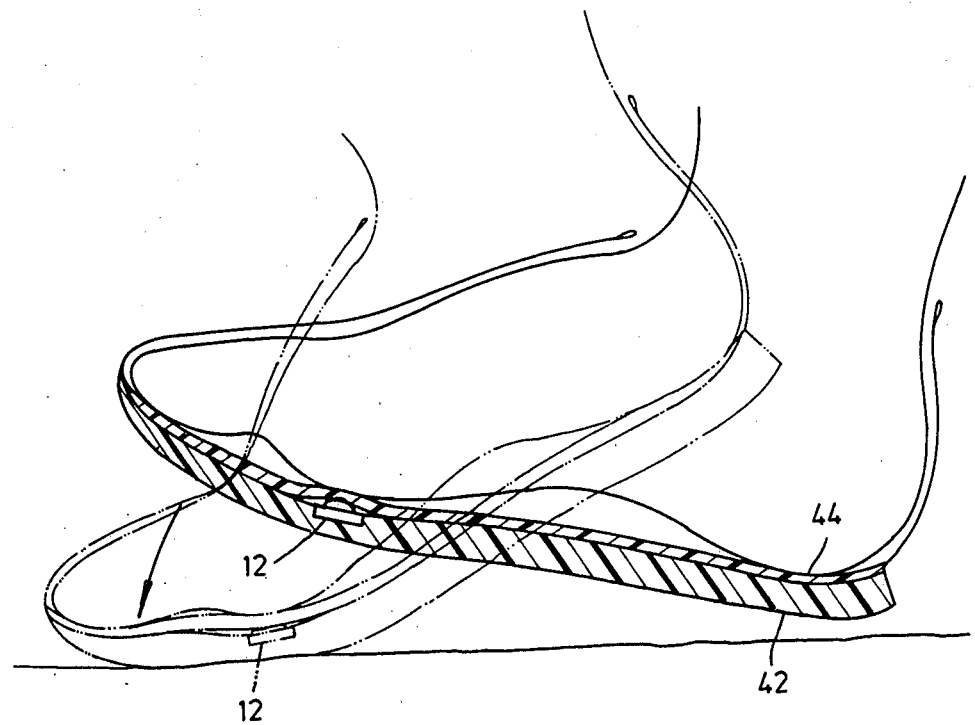
FIG. 5 is a diagram showing the position where the switch and the condition that the shoe is going to step on the ground.
Figure 7:
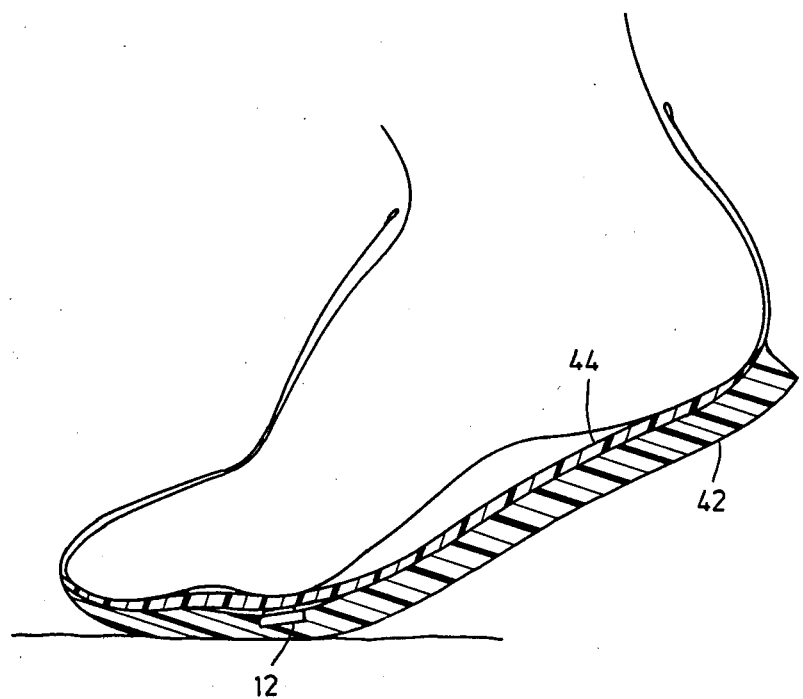
FIG. 7 is a diagram showing that the user's shoe steps on the ground and that the joints of his big toe are compressing switch.
Figure 8:
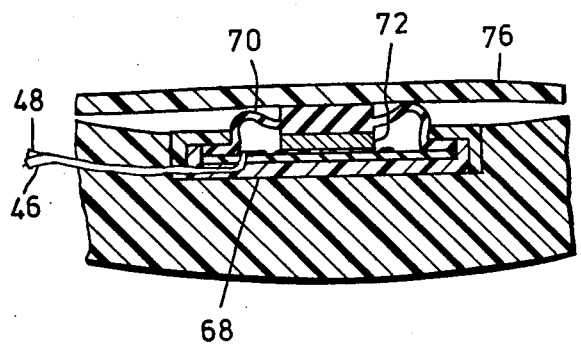
FIG. 8 is a broken sectional view showing contact connecting simultaneously with contacts.

As shown in FIGS. 7 & 8, when walking, the foot pad 76 is compressed to make contact 72 and the contacts 64 and 66 touch and define an ON condition. As shown in FIG. 5 and 6, when lifting the shoe, the elasticity of the insulating rubber 70 removes the contact 72 from the contacts 64 and 66 to provide an OFF condition.

Figure 10:
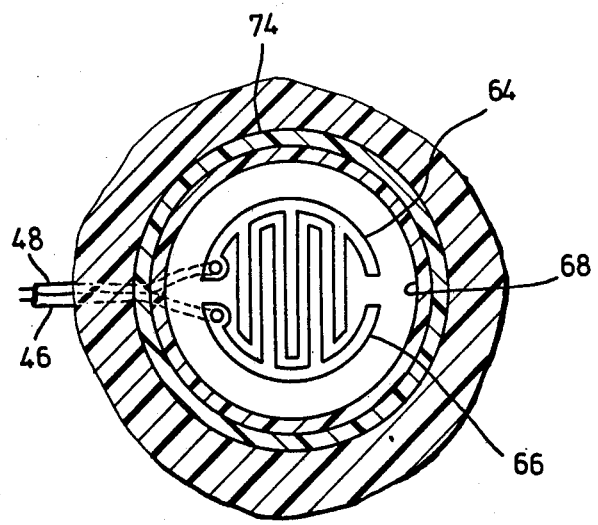
FIG. 10 is a sectional view taken along lines 2—2 of FIG. 6, showing the layout of the contacts on the insulating board.

As shown in FIG. 10, the contacts 64 and 66 are disposed on the insulating board 70. They are interdigitated (but do not connect) in order to provide more opportunity of touch to contact 72. Thus, foot pad 76 is compressed the switch can precisely define ON condition.

What is claimed is:

1. Apparatus adapted for disposition on a shoe, comprising:
    a switch device, disposed proximate to the toe of said shoe, for generating a pace signal in response to each pace by said shoe;
    an electronic device removably fixed in the toe of said shoe, removably connected to said switch device, and responsive to said pace signals, said electronic device comprising: means, responsive to said pace signals, for generating a pace count signal indicative of the number of paces;
    a display device, viewably disposed on the top of said shoe, and responsive to input signals applied thereto, for providing indicia of said input signals; and
    means for selectively applying said pace count signal to said display device as said input signal.

2. The apparatus of claim 1 wherein said electronic device further comprises:
    means for selectively generating a pace distance signal indicative of the distance of one pace;
    means, responsive to said pace count signal and said pace distance signal, for generating a distance traveled signal indicative of the product of said pace count and pace distance; and
    means for selectively applying said distance traveled signal to said display device.

3. Apparatus adapted for disposition on a shoe, comprising:
    a switch means, disposed in the proximity of the toe of said shoe, for generating a pace signal in response to each pace taken with said shoe;
    an electronic device, removably secured on the upper portion of said shoe, disengagedly connected to said switch means and responsive to said pace signals, said electronic device including:
    counter means, responsive to said pace signals;
    data entry means, disposed on said shoe, for providing data representative of the distance of one pace;
    multiplier means for multiplying said pace distance data by the number of paces to determine the distance traveled;
    display means, disposed for viewing upon the upper portion of said shoe, and responsive to input signals applied thereto, for generating indicia of said input signals;
    selection means, responsive to control signals applied thereto, for selectively applying signals indicative of one of said pace counts and said distance traveled as input signals to said display means; and
    means, disposed on said shoe, for generating said control signals.

4. The apparatus of claim 3, wherein said switch is placed under the joints of toes.

5. A shoe comprising:
    a sole including a sole toe portion and a shoe heel portion;
    an upper, attached to said sole and including an upper toe portion and an upper heel portion;
    a switch, disposed in said sole, toe portion, for actuation in response to steps taken with said shoe;
    an electronic device, formed in said upper toe portion, and including:
    a counter, responsive to pace input signals applied thereto, for generating a pace count signal indicative of the number of paces taken by said shoe;
    storage means, responsive to pace distance input signals applied thereto, for selectively storing indicia of the distance of paces taken by said shoe;
    multiplier means, cooperating with said counter and said storage means for generating total distance signals indicative of the product of said number of paces and said pace distance;
    display means, responsive to input signals applied thereto, for generating a display in accordance with said input signals;
    selector means, responsive to control signals applied thereto, for selectively applying said pace count signal and said total distance signal as input signals to said display means;
    keyboard means, operatively coupled to said storage means and said selector means, for controllably generating said pace distance signals to said storage means and said control signals to said selector means;
    a receptical, formed on said upper toe portion, for removably receiving said electronic device and disposing said electronic device such that said display means and keyboard means are viewable and accessible to said upper toe portion; and,
    connector means for effecting detachable electrical connection between said switch and said electronic device, whereby pace input signals are applied to said counter means in response to actuation of said switch.

6. The shoe of claim 5 wherein said electronic device further includes filter means for wave shaping signals applied thereto, interposed between said switch and said counter means.

7. The shoe of claim 5 wherein said switch comprises:
    a generally flat insulative member disposed on said sole toe portion;
    first and second interdigitated conductive members formed on said flat insulative member and respectively connected to said connector means;
    a third conductive member;
    elastic means cooperating with said third conductive member for disposing said third conductor in a position overlying but removed from said first and second conductors, in the absence of extrinsic pressure, and responsive to extrinsic pressure from a pace with said shoe, disposing said third conductive member in contact with both said first and second conductive members to effect an electrical connection between said first and second conductive members.

* * * * *